United States Patent
Kajuch

[19]

[11] Patent Number: 6,109,076
[45] Date of Patent: Aug. 29, 2000

[54] AUTOMOBILE AND AIRBAG ANTI-THEFT DEVICE

[75] Inventor: Pete Kajuch, Brookfield, Wis.

[73] Assignee: Master Lock Company, Milwaukee, Wis.

[21] Appl. No.: 09/306,014

[22] Filed: May 6, 1999

[51] Int. Cl.[7] .................................................. B60R 25/02
[52] U.S. Cl. ................................ 70/209; 70/14; 70/226; 70/237
[58] Field of Search ............................. 70/14, 209–212, 70/237, 238, 225, 226

[56] References Cited

U.S. PATENT DOCUMENTS

| | | | |
|---|---|---|---|
| D. 289,491 | 4/1987 | Johnson | D8/330 |
| D. 306,252 | 2/1990 | Johnson | D8/331 |
| D. 339,974 | 10/1993 | Wilcox | D8/343 |
| D. 351,551 | 10/1994 | Wilcox | D8/343 |
| D. 364,669 | 11/1995 | Winner | D22/117 |
| D. 372,418 | 8/1996 | Winner | D8/346 |
| D. 383,372 | 9/1997 | Winner | D8/346 |
| D. 385,175 | 10/1997 | Somerfield | D8/330 |
| D. 391,142 | 2/1998 | Winner | D8/333 |
| D. 398,830 | 9/1998 | Winner | D8/333 |
| 1,154,389 | 9/1915 | Fogalsang . | |
| 1,262,656 | 4/1918 | Fisher . | |
| 1,329,913 | 2/1920 | McGuire . | |
| 1,368,054 | 2/1921 | Recher . | |
| 1,395,532 | 11/1921 | Tilden . | |
| 1,864,883 | 6/1932 | Anderson . | |
| 2,140,066 | 12/1938 | White | 70/14 |
| 3,462,982 | 8/1969 | Moore | 70/209 |
| 3,664,164 | 5/1972 | Zaidener | 70/202 |
| 3,982,602 | 9/1976 | Gorman | 180/114 |
| 4,617,810 | 10/1986 | Fish et al. | 70/14 |
| 4,651,849 | 3/1987 | Givati | 180/287 |
| 4,738,127 | 4/1988 | Johnson | 70/209 |
| 4,856,308 | 8/1989 | Johnson | 70/209 |
| 4,935,047 | 6/1990 | Wu | 70/209 |
| 4,949,561 | 8/1990 | Solow et al. | 70/209 |
| 4,958,084 | 9/1990 | Carlo et al. | 307/10.2 |
| 5,007,259 | 4/1991 | Mellard | 70/209 |
| 5,024,069 | 6/1991 | Hull, Jr. et al. | 70/209 |
| 5,031,429 | 7/1991 | Wang | 70/209 |
| 5,113,673 | 5/1992 | Shen | 70/209 |
| 5,132,551 | 7/1992 | Carlo et al. | 307/10.3 |
| 5,184,023 | 2/1993 | Carlo et al. | 307/10.3 |
| 5,199,284 | 4/1993 | Lin | 70/209 |
| 5,222,381 | 6/1993 | Wilcox | 70/19 |
| 5,259,222 | 11/1993 | Jang | 70/209 |
| 5,267,458 | 12/1993 | Heh | 70/238 |
| 5,275,030 | 1/1994 | Cole | 70/209 |

(List continued on next page.)

FOREIGN PATENT DOCUMENTS

| | | | |
|---|---|---|---|
| 919367 | 3/1947 | France . | |
| 2487275 | 7/1980 | France | B60R 25/02 |
| 2501134 | 3/1981 | France | B60R 25/02 |
| 2520313A | 4/1982 | France | B60R 25/00 |
| 389215 | 3/1923 | Germany . | |
| 684481 | 5/1938 | Germany . | |
| 361686 | 11/1931 | United Kingdom . | |
| 1127524 | 9/1968 | United Kingdom | B60R 25/02 |
| 2110175A | 6/1983 | United Kingdom | B60R 25/00 |

*Primary Examiner*—Suzanne Dino Barrett
*Attorney, Agent, or Firm*—Pennie & Edmonds LLP

[57] ABSTRACT

An anti-theft device is provided to deter theft of an automobile and driver's side airbag. The device combines a shield that covers the airbag and at least a portion of the steering wheel and an extensible, ratcheted steering wheel lock. The anti-theft device includes a concave area for accommodating the airbag and a pair of hooks for attaching to the device to the steering wheel.

15 Claims, 8 Drawing Sheets

U.S. PATENT DOCUMENTS

| | | | |
|---|---|---|---|
| 5,277,042 | 1/1994 | Tobias | 70/209 |
| 5,278,537 | 1/1994 | Carlo et al. | 340/384.1 |
| 5,287,006 | 2/1994 | Carlo et al. | 307/10.3 |
| 5,297,406 | 3/1994 | Lin | 70/209 |
| 5,326,007 | 7/1994 | Pudney et al. | 224/321 |
| 5,353,614 | 10/1994 | Anderson | 70/209 |
| 5,361,612 | 11/1994 | Voiculescu et al. | 70/241 |
| 5,365,215 | 11/1994 | Carlo et al. | 340/426 |
| 5,369,970 | 12/1994 | Voiculescu et al. | 70/240 |
| 5,383,254 | 1/1995 | Wigley, Sr. | 16/82 |
| 5,397,925 | 3/1995 | Carlo et al. | 307/10.3 |
| 5,412,963 | 5/1995 | Carlo et al. | 70/209 |
| 5,415,018 | 5/1995 | Ferrante | 70/209 |
| 5,416,464 | 5/1995 | Rimback et al. | 340/426 |
| 5,449,957 | 9/1995 | Carlo | 307/10.3 |
| 5,450,736 | 9/1995 | Volkmar | 70/209 |
| 5,454,143 | 10/1995 | Wigley | 16/82 |
| 5,454,240 | 10/1995 | Whitney | 70/209 |
| 5,471,855 | 12/1995 | Wu | 70/209 |
| 5,488,844 | 2/1996 | Winner | 70/18 |
| 5,490,304 | 2/1996 | Winner, Jr. et al. | 16/82 |
| 5,531,344 | 7/1996 | Winner | 222/1 |
| 5,537,847 | 7/1996 | Dalton et al. | 70/209 |
| 5,538,167 | 7/1996 | Winner | 224/425 |
| 5,540,067 | 7/1996 | Kim | 70/209 |
| 5,548,983 | 8/1996 | Hart | 70/209 |
| 5,555,753 | 9/1996 | Matlock | 70/209 |
| 5,566,561 | 10/1996 | Hucknall | 70/209 |
| 5,590,928 | 1/1997 | Voiculescu | 292/338 |
| 5,595,078 | 1/1997 | Harrell | 70/209 |
| 5,598,142 | 1/1997 | Winner, Jr. | 340/438 |
| 5,600,979 | 2/1997 | Winner et al. | 70/252 |
| 5,604,384 | 2/1997 | Carlo et al. | 307/10.5 |
| 5,613,383 | 3/1997 | Banez | 70/209 |
| 5,619,873 | 4/1997 | Wood | 70/209 |
| 5,635,899 | 6/1997 | Carlo et al. | 340/426 |
| 5,666,832 | 9/1997 | Cunningham | 70/209 |
| 5,673,575 | 10/1997 | Carlo et al. | 70/209 |
| 5,676,001 | 10/1997 | Ho | 70/209 |
| 5,677,668 | 10/1997 | Winner, Jr. | 340/438 |
| 5,706,681 | 1/1998 | Gorohovsky | 70/209 |
| 5,709,113 | 1/1998 | Godfrey | 70/233 |
| 5,735,149 | 4/1998 | Winner, Jr. | 70/209 |
| 5,755,122 | 5/1998 | Higginson | 70/209 |
| 5,755,123 | 5/1998 | Winner, Jr. | 70/209 |
| 5,755,124 | 5/1998 | Chang | 70/209 |
| 5,782,116 | 7/1998 | Ryan et al. | 70/209 |
| 5,784,908 | 7/1998 | Hileman, Jr. | 70/209 |
| 5,816,082 | 10/1998 | Gabrielyan | 70/209 |
| 5,836,186 | 11/1998 | Winner, Jr. | 70/209 |
| 5,842,360 | 12/1998 | Somerfield | 70/209 |
| 5,865,044 | 2/1999 | Wu | 70/209 |
| 5,868,016 | 2/1999 | Duran, Sr. | 70/209 |
| 5,875,661 | 3/1999 | Ho | 70/209 |
| 5,906,122 | 5/1999 | Jinn-Fu | 70/209 |

AUTOMOBILE AND AIRBAG ANTI-THEFT DEVICE

BACKGROUND OF THE INVENTION

Locking devices for attachment to the steering wheel of an automobile are known. These devices are typically secured into a position on the steering wheel such that the device extends sufficiently away from the steering wheel so as to contact the interior of the automobile when the steering wheel is turned. Thereby, the steering wheel is prevented from full rotation, and theft of the automobile is discouraged. These devices are extensible between a collapsed, unsecured position and an extended, secured position.

In response to attempts at overcoming these locking devices by cutting through the steering wheel itself and removing the locking device, guards have been provided to be used in combination with the locking devices. The guards, such as described in U.S. Pat. Nos. 5,613,383 and Des. 372,418, are made of a cut-resistant material and cover the steering wheel rim. The guard is secured to the steering wheel by passing a hook of the lock through an opening in the guard. Because of the materials and size of the guards, storage and handling is difficult. Attempts at facilitating storage include providing collapsible or foldable guards; however, such features also add to the complexity and difficulty of handling the guard. In addition, the guard has to be used in combination with a separate locking device, again adding complexity and expense.

U.S. Pat. Nos. 5,353,614 and 5,537,847 combine a cover with a bar in an attempt to simplify use. These combination devices also suffer shortcomings. For example, a first hook member attached to the cover and a second hook member attached to the bar or elongate member are oriented and adapted to engage the steering wheel. These first and second hook members are shown oriented in line with each other across the cover. This orientation creates a pivot point that could permit the cover to be pried away from the steering wheel to permit access thereto. In addition, since newer automobiles contain driver's side airbags disposed within the interior of the steering wheel causing the interior or center region of the steering wheel to protrude outward, the use of these generally flat circular devices is either undesirable or impossible. However, leaving the interior of the steering wheel uncovered exposes the airbags to theft.

Therefore, the need exists for a locking device to prevent the theft of both an automobile and a driver's side airbag. Such a device should be easier to handle, mount, operate, and store. Overall a suitable device should be lighter in weight, sized to be the minimal size necessary to adequately protect the airbag, constructed of a minimum number of parts, and arranged to be more difficult to pry away or to remove forcibly from the steering wheel.

SUMMARY OF THE INVENTION

In accordance with the present invention, an automobile and airbag anti-theft device is provided to prevent theft of both the automobile and the driver's side airbag. The device combines a ratcheted, extensible bar to prevent rotation of the steering wheel with a saw resistant shield body covering at least a portion of the steering wheel including the section housing the airbag.

Attachment to the steering wheel is accomplished by a pair of hooks. A first hook fixed to the shield body is engaged onto the steering wheel. A second hook attached to a bar which is slideably disposed in the shield body, engages the steering wheel as the bar is slid and locked into an extended position. The first and second hooks are arranged on opposite sides of the top and bottom of the airbag section of the steering wheel to inhibit prying of the device away from the steering wheel. Overall, the device is light in weight, easy to install and store, and made of a minimum number of parts to facilitate ease of manufacture and use.

DESCRIPTION OF THE PREFERRED EMBODIMENT

Figure 1:
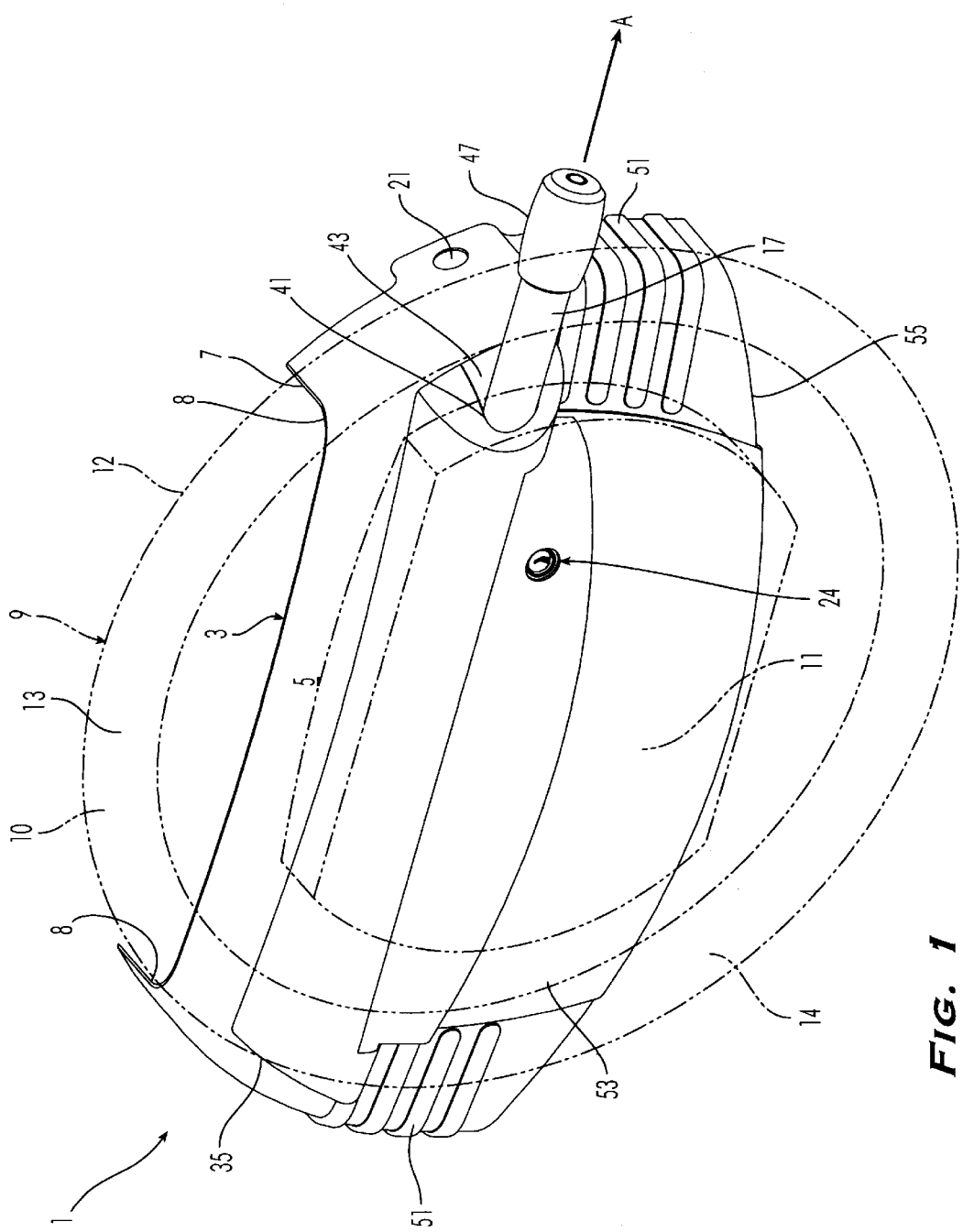
FIG. 1 is a front top perspective view of the automobile and airbag anti-theft device in an unlocked position with a steering wheel shown in phantom.
Figure 2:
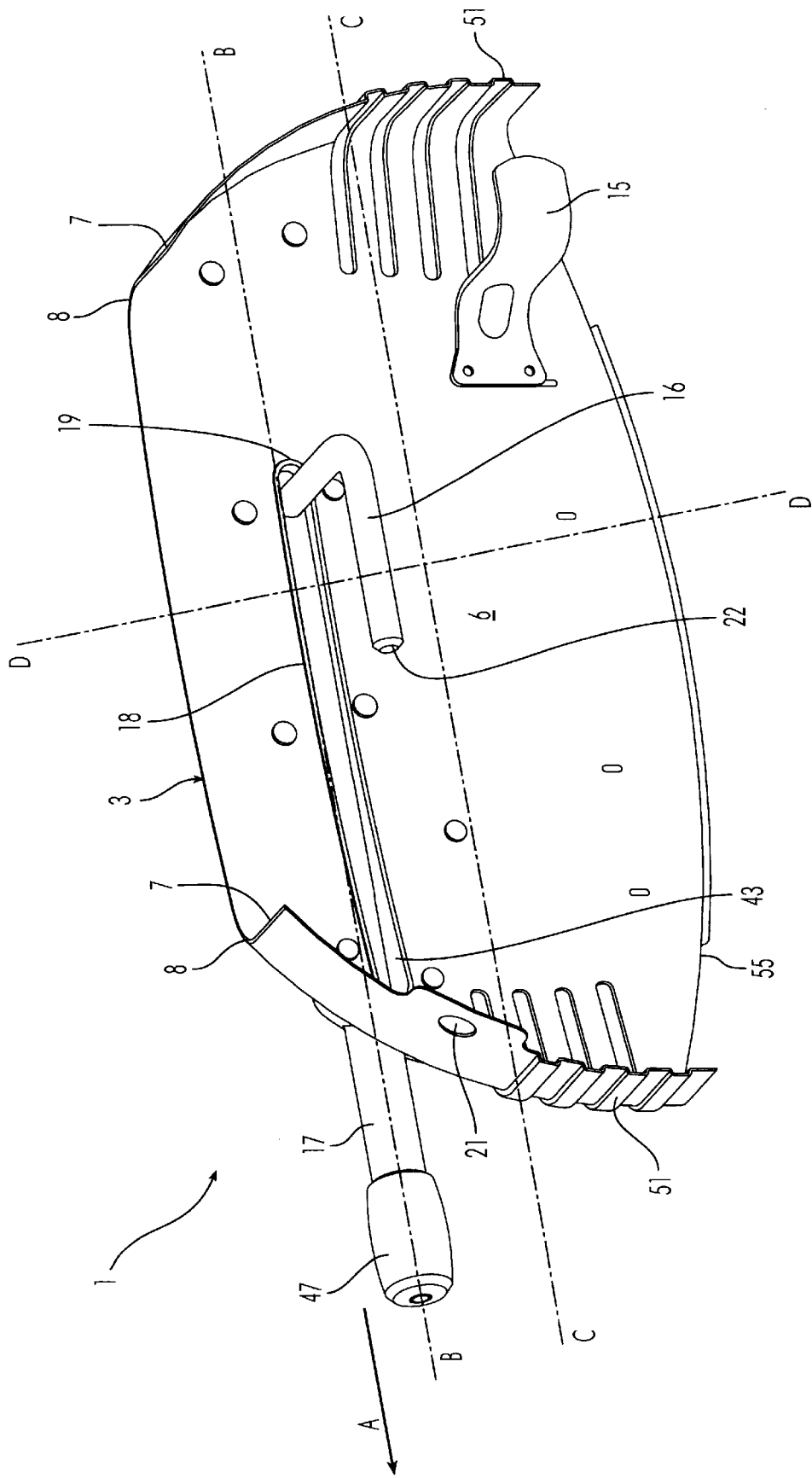
FIG. 2 is a back top perspective view of the automobile and airbag anti-theft device in an unlocked position.
Figure 3:
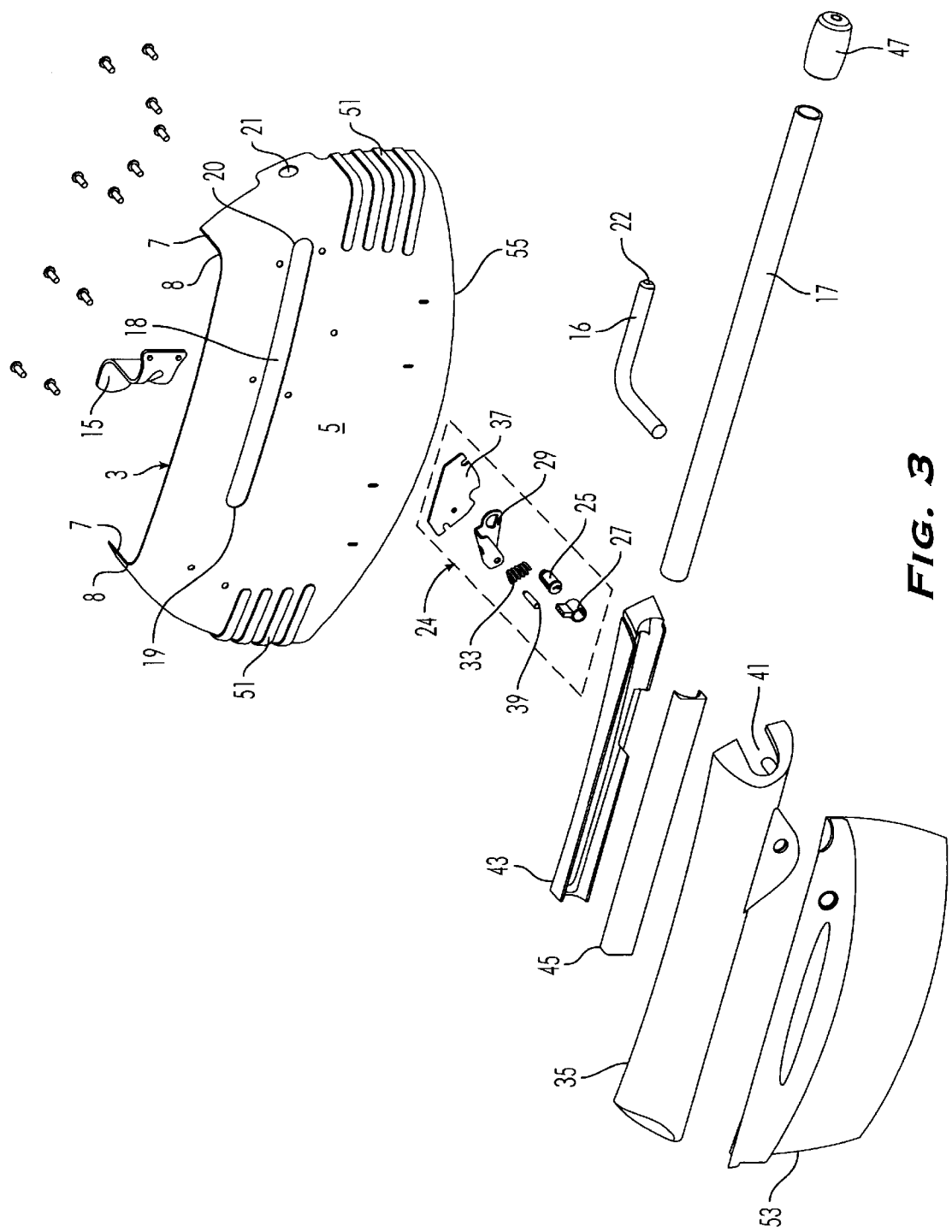
FIG. 3 is an exploded front perspective view of the automobile and airbag anti-theft device.

Referring to FIGS. 1–3, the automobile and airbag anti-theft device 1 of the present invention includes a shield body 3 having a front 5, a back 6, and a flange 7 running along side edges 8 of the shield body 3. When installed on a steering wheel 9 having a steering wheel section 10 and an airbag section 11 protruding toward the driver to accommodate an airbag, the front 5 faces out into the passenger cabin toward the driver, and the back 6 faces the steering wheel 9. The shield body 3 is sized and shaped to cover at least a portion of the steering wheel 9. In particular, the shield body 3 covers a sufficient amount of the air bag section 11 of the steering wheel 9 to prevent access to and resultant theft of the airbag (not shown).

In addition, the shield body 3 covers at least a portion of the steering wheel section 10 with the flange 7 covering and protecting the associated areas of the exterior perimeter 12 of the steering wheel section 10. The shield body 3 covers a sufficient amount of the steering wheel section 10 to inhibit removal of the device 1 by sawing through the steering wheel section 10. Preferably, the shield body 3 is not any larger than necessary to cover the airbag section 11 and a sufficient amount of the steering wheel section 10 to inhibit removal of the anti-theft device 1 by sawing through the steering wheel section 10. In covering only a portion of the steering wheel 9, the shield body 3 defines uncovered parts of the steering wheel. As shown in FIG. 1, the shield body 3 defines a first uncovered part 13 at the top of the steering wheel 9 on a first side of the shield body 3 and a second uncovered part 14 at the bottom of the steering wheel 9 on a second side of the shield body 3 opposite the first side. Thus, the size and weight of the ant-theft device 1 are minimized, and handling and storage are improved. The shield body 3 is constructed of a cold rolled hardened steel material about $^{40}/_{1000}$ to $^{50}/_{1000}$ of an inch thick that is resistant to sawing, although combinations of materials such as metals and plastics can also be used to further reduce the weight of the anti-theft device 1.

As is best shown in FIG. 2, attached to the back 6 of the shield body 3 is a first hook 15 for engaging a first location on the steering wheel section 10. The first hook 15 is formed from a piece of cylindrical or flat material, such as $90/1000$ of an inch stamped steel. The first hook 15 is attached by any suitable mechanical attachment means including bolts, rivets, and welds and may also be stamped from the shield body 3 material itself. A second hook 16 is provided for engagement with a second location on the steering wheel section 10. The second hook 16, made of cold rolled steel, is attached to a bar 17 made of steel tube disposed adjacent the front 5 and slideable with respect to the shield body 3. The second hook 16 extends from the bar 17 through a slot 18 in the shield body 3. Thus, the second hook 16 is disposed on the back 6.

The second hook 16 is slideably disposed in the slot 18 between a first slot end 19 and a second slot end 20, with at least the second slot end 20 being adjacent the flange 7. In operation, the bar 17 is slideable between an unlocked position adjacent the first slot end 19 as shown, for example, in FIG. 2 and a locked position adjacent the second slot end 20 as shown, for example, in FIG. 4. In particular with respect to FIG. 4, the steering wheel section 10 diameter is shown substantially the same size as the shield body 3. The bar 17 has been slid or extended in the direction of arrow A to a position for contacting the automobile interior and preventing full rotation of the steering wheel 9. Moreover, the second hook 16 has moved along a predetermined path to the locked position and extends through a hole 21 disposed in the flange 7 in the path of movement of the second hook 16. Thus, the steering wheel section 10 adjacent the second hook 16 is completely surrounded by the second hook 16, flange 7, and shield body 3. This arrangement provides added security to the anti-theft device 1.

Figure 5:
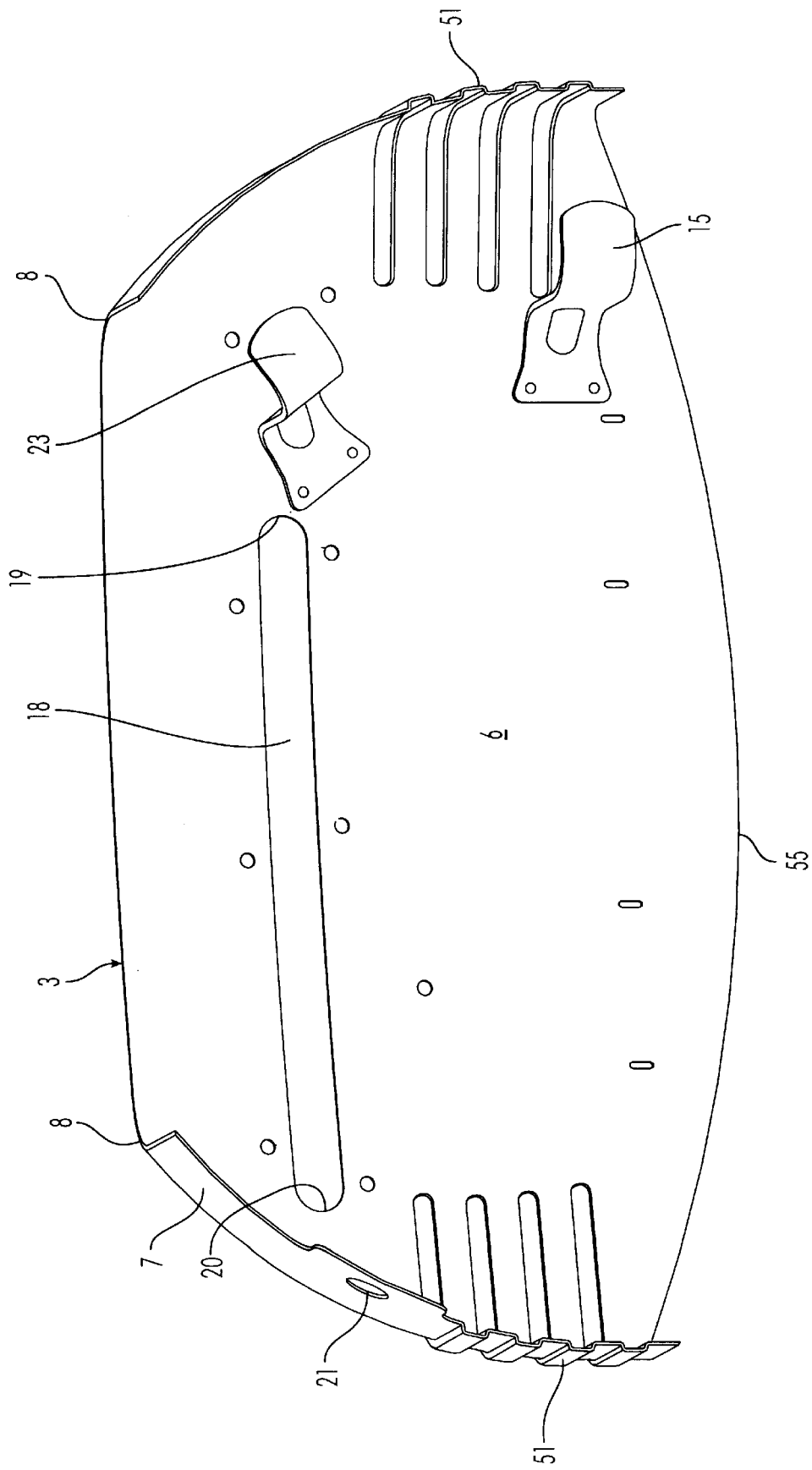
FIG. 5 is a back top perspective view of an alternative embodiment of the shield body of the present invention.

The steering wheel section 10 diameter need not be substantially the same size as the shield body 3, because the shield body 3 can be arranged to accommodate a range of steering wheel 9 sizes, adding to its versatility. For example, suitable steering wheels 9 have a steering wheel section 10 with a 14.5 inch to 15.5 inch exterior dimension and a thickness of about 1.2 to 1.6 inches. In order to accommodate the steering wheel section 10 thickness, the first hook 15 is spaced from the flange 7 a distance of about 1.2 to about 1.6 inches. The second hook 16 can engage a steering wheel section 10 disposed anywhere between the first slot end 19 and the second slot end 20. Since the second hook 16 moves between the first and second slot ends in moving from the locked to the unlocked position, the second hook 16 is long enough so that the distal end 22 engages the hole 21 before the second hook 16 is extended to and engages the second slot end 20. As is best shown in FIG. 5, the shield body 3 may include at least one additional hook 23 to provide added security. The additional hook 23 is also disposed on the back 6 and is positioned to maintain the same space relative to the flange 7 as the first hook 15. All of the hooks may include soft vinyl covers to protect the steering wheel 9.

Figure 4:
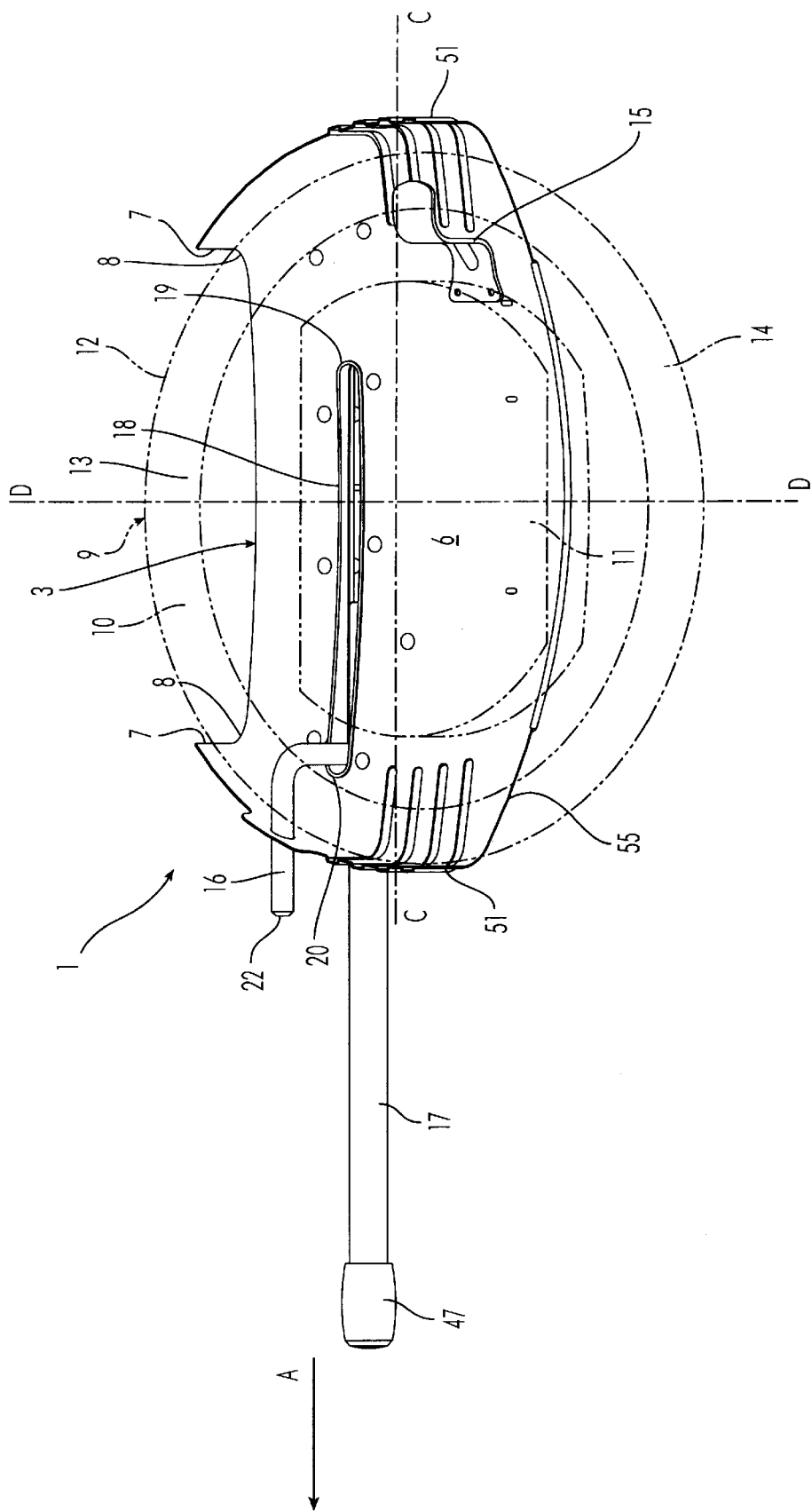
FIG. 4 is back bottom perspective view of the automobile and airbag anti-theft device in locked position with a steering wheel shown in phantom.

As is best shown in FIGS. 2 and 4, the second hook 16 moves between the first and second slot ends, generally defining line B. The line B may be seen as a pivot axis about which the shield body 3 can be rotated. Preferably, line B is not collinear with either the horizontal center line C or vertical center line D of the shield body 3. Moreover, the second hook 16 is disposed on a first side of the horizontal and vertical center lines in the locked position. If the first hook 15 fell along line B as well, then the shield body could still pivot about this line, permitting access to the steering wheel and airbag. Therefore, the first hook 15 is not disposed along line B, nor is it disposed on the first side of the horizontal and vertical center lines. Instead, the first hook 15 is disposed in a location spaced from line B, preferably on a second side of both the horizontal and vertical center lines opposite the first side. This arrangement places the hooks on opposite sides of the airbag section 11 and diagonally across the shield body 3 from one another. Thus, the shield body 3 is more securely held against the steering wheel 9 and accommodates the large central airbag section 11 of the steering wheel 9.

Figure 6:
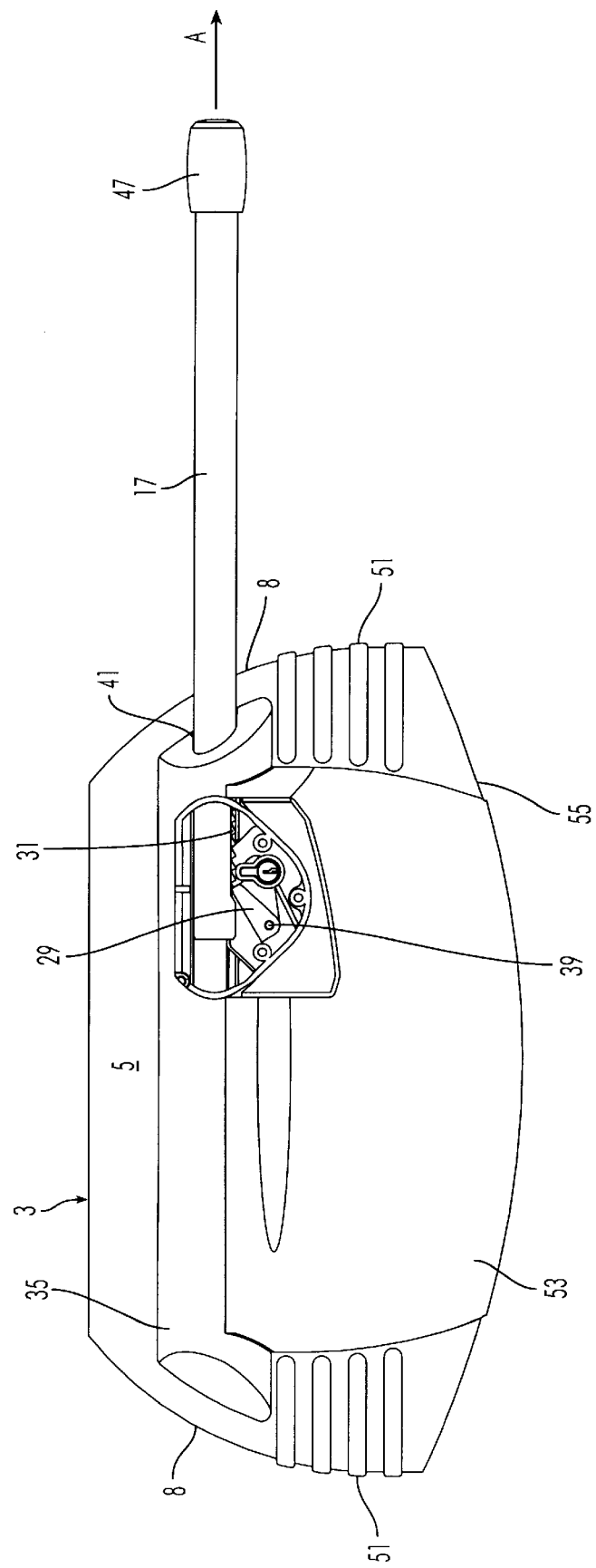
FIG. 6 is a cut-away front view of the automobile and airbag anti-theft device in the locked position.

The bar 17 is secured in either the unlocked or locked position and prevented from movement by operable attachment to a key-operable lock 24. As is best shown in FIGS. 3 and 6, the lock 24 includes a standard cylinder 25 and shell 27 arrangement. A pawl 29 is biased into engagement with a series of notches 31 in the bar 17 by a spring 33. The notches 31 and pawl 29 constitute a rachet type arrangement that permits the bar 17 to be moved in the direction of arrow A, i.e., toward the locked position, without turning the cylinder 25. In order to move the bar 17 toward the unlocked position, the cylinder 25 is rotated, camming the pawl 29 out of engagement with the notches 31 and allowing movement of the bar 17 toward the unlocked position. The lock 24 is mounted between a housing 35 and a mounting plate 37 and secured there between by a pin 39. The mounting plate 37 prevents the lock 24, in particular the pawl 29, from disengaging the bar 17 if the cylinder 25 is subjected to impact. Suitable materials for the housing include die-cast aluminum. The pin 39 also serves as a pivot point for the pawl 29.

The housing 35 is attached to the front 5 of the shield body 3 and provides a passage 41 for accepting the bar 17 and mounts the bar 17 to the shield body 3. A bar guide 43 is provided between the bar 17 and the front 5 of the shield body 3 to act as a bearing surface, facilitating movement of the bar 17. Additional assistance in sliding the bar 17 may be provided by a secondary bar guide 45 included between the bar 17 and the housing 35, providing an even larger bearing surface. Suitable materials for the bar guides include plastics such as nylon. The bar 17 includes a handle 47 made of soft vinyl.

The housing 35 covers a sufficient portion of the front 5 of the shield body 3 to provide additional rigidity and stiffness to the shield body 3. Preferably, the housing 35 extends substantially across the entire front 5 of the shield body 3. As is best shown in FIG. 4, the shield body 3 is bowed away from the steering wheel 9 or is concave when viewed from the back 6. This shape accommodates the airbag section 11 which typically protrudes outward from the steering wheel 9 toward the driver. Thus, a more form-fitting and more secure attachment of the device to the steering wheel is provided. In addition, the bar guide 43 is shaped to account for the bowed shield body 3, providing for the use of a straight bar 17. Additional support to the shield body 3 may be provided by a plurality of ribs 51. These ribs 51 extend along the shield body 3 and onto the flange 7. The ribs 51 also provide gripping points for the shield body 3.

In order to protect the anti-theft device 1 from damage and also to protect the car interior and driver from scraping and marring caused by the anti-theft device 1, a plastic cover 53 is provided. Suitable materials for the plastic cover 53 include ABS and nylon. The plastic cover 53 may be colored and covers at least a portion of the front 5 and the housing 35. In addition, the plastic cover 53 wraps around a bottom edge 55 of the shield body 3 to protect the same.

Figure 7:
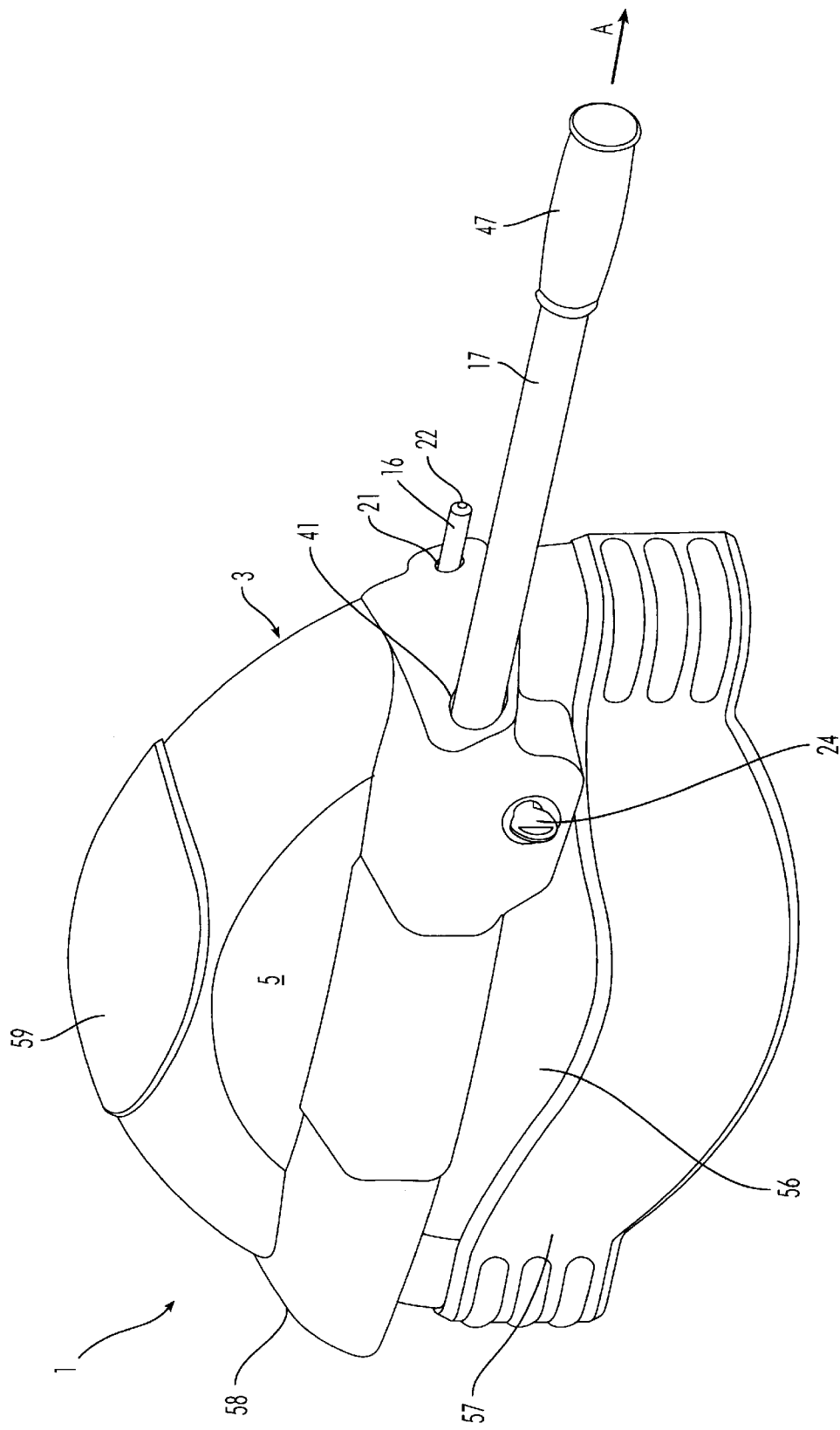
FIG. 7 is a front perspective view of another embodiment of the automobile and airbag an device in the locked position.
Figure 8:
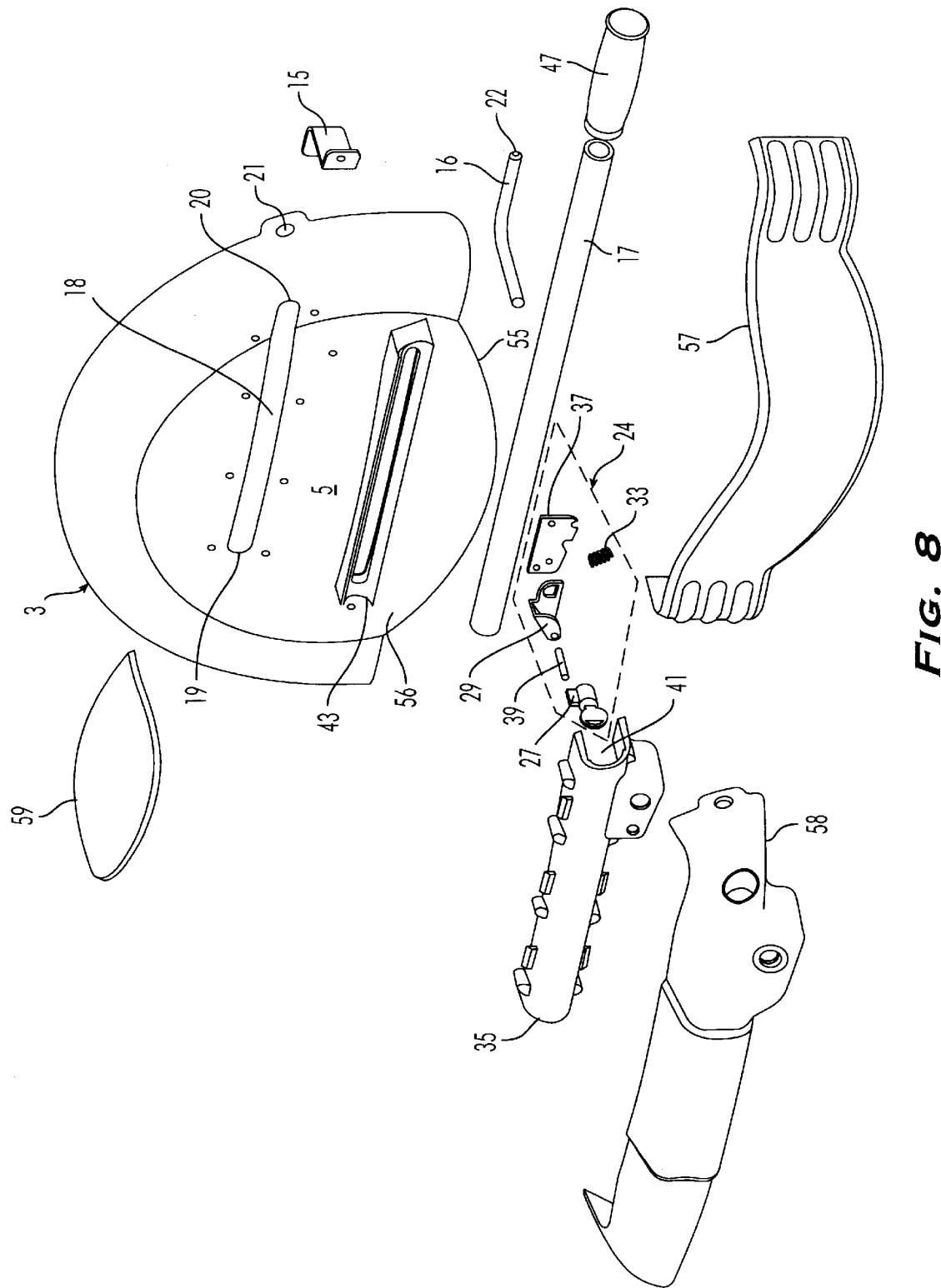
FIG. 8 is an exploded front perspective view of another embodiment of the automobile and airbag anti-theft device.

An alternative embodiment of the anti-theft device of the present invention is shown in FIGS. 7 and 8, however, it is understood that any of the features of one embodiment can be used in the other embodiment. In this embodiment, the entire shield body 3 does not have to be bowed, but a center bubble section 56 can be provided thus providing an independently form fitting construction for the steering wheel section 10 and the airbag section 11 of the steering wheel 9. As is shown in FIG. 8, the housing 35 may extend only partially across the front 5. Moreover, the plastic cover may be provided in a first cover part 57 and a second cover part 58. Additional auxiliary covers 59 may also be attached to the shield body 3 to provide additional protection. Further, this embodiment provides for only one uncovered portion at the bottom of the steering wheel 9. The shield body 3 extends completely around the top of the steering wheel 9, and the auxiliary cover 59 is provided to cover this top portion of the shield body 3.

In operation, the anti-theft device 1 with the bar 17 in the unlocked position is inserted onto the steering wheel 9 such that the first hook 15 engages the first location of the steering wheel section 10. The shield body 3 is aligned to cover the airbag section 11 and the steering wheel section 10. The bar 17 is then extended in the direction of arrow A to the locked position. Inserting a key into the lock and rotating, permits the bar 17 to be pushed into the housing 35 to the unlocked position and the anti-theft device 1 can be removed.

What is claimed is:

1. An automobile and airbag anti-theft device for attachment to an automotive steering wheel having a steering wheel section with an exterior perimeter and an airbag section, the anti-theft device comprising:
   a) a shield body sized to cover only a portion of the steering wheel section and the airbag section;
   b) a bar slidably attached to the shield body and moveable between an unlocked position and a locked position, complete rotation of the steering wheel being prevented by the bar in the locked position;
   c) a first hook fixed to the shield body to engage a first location on the steering wheel section;
   d) a second hook fixed to the bar to engage a second location on the steering wheel section in the locked position, the anti-theft device being secured to the steering wheel in the locked position by the first and second hooks, wherein:
      i) the second hook in moving between the locked and unlocked positions defines a line across the shield body; and
      ii) the first hook is disposed in a location spaced from said line; and
   e) a lock operatively connected to the bar to prevent movement of the bar from the locked to the unlocked position.

2. The anti-theft device of claim 1, wherein the shield body in covering only a portion of the steering wheel defines a first uncovered part of the steering wheel disposed on a first side of the shield and a second uncovered part of the steering wheel disposed on a second side of the shield opposite the first side.

3. The anti-theft device of claim 2, wherein the shield body is positioned on the steering wheel such that:
   a) the first uncovered part is a top part of the steering wheel; and
   b) the second uncovered part is a bottom part of the steering wheel.

4. An automobile and airbag anti-theft device for attachment to an automotive steering wheel having a steering wheel section with an interior and an exterior perimeter and an airbag section, said wheel further having a front side for facing a driver operating the wheel and a back side facing in the opposite direction, the anti-theft device comprising:
   a) a rigid, one piece shield body sized to cover at least a portion of the steering wheel section and the airbag section;
   b) a bar slidably attached to the shield body and moveable between an unlocked position and a locked position, complete rotation of the steering wheel being prevented by the bar in the locked position;
   c) a first hook fixed to the shield body to engage a first location on the back side and the interior perimeter of the steering wheel section;
   d) a second hook fixed to the bar to engage a second location on the back side and the interior perimeter of the steering wheel section in the locked position, the anti-theft device being secured to the steering wheel in the locked position by the first and second hooks, wherein:
      i) the second hook in moving between the locked and unlocked positions defines a line across the shield body; and
      ii) the first hook is disposed in a location spaced from said line; and
   e) a lock operatively connected to the bar to prevent movement of the bar from the locked to the unlocked position.

5. The anti-theft device of claim 4, wherein:
   a) the second hook is disposed on a first side of both a horizontal center line and a vertical center line of the shield body; and
   b) the first hook is located on a second side opposite the first side of the vertical and horizontal center lines.

6. The anti-theft device of claim 5, further comprising at least one additional hook disposed on the shield body for engaging the steering wheel section.

7. An automobile and airbag anti-theft device for attachment to an automotive steering wheel having a steering wheel section with an interior and an exterior perimeter and an airbag section, said wheel further having a front side for facing a driver operating the wheel and a back side facing in the opposite direction, the anti-theft device comprising:
   a) a rigid, one piece shield body sized to cover at least a portion of the steering wheel section and the airbag section, the shield body comprising:
      i) side edges; and
      ii) a flange which extends from the side edges to cover adjacent areas of said exterior perimeter of the steering wheel;
   b) a bar slidably attached to the shield body and moveable between an unlocked position and a locked position, complete rotation of the steering wheel being prevented by the bar in the locked position;
   c) a first hook fixed to the shield body to engage a first location on the back side and the interior perimeter of the steering wheel section;
   d) a second hook fixed to the bar for movement along a predetermined path to engage a second location on the back side and the interior perimeter of the steering wheel section in the locked position, the anti-theft device being secured to the steering wheel in the locked position by the first and second hooks, wherein:
      i) the flange further comprises a hole disposed in the path of movement of said second hook; and ii) the second hook is engaged in the hole in said locked position such that the second location of the steering wheel section is surrounded by the second hook, the flange, and the shield body, wherein:
   i) the second hook in moving between the locked and unlocked positions defines a line across the shield body; and
   ii) the first hook is disposed in a location spaced from said line; and
e) a lock operatively connected to the bar to prevent movement of the bar from the locked to the unlocked position.

8. The anti-theft device of claim 7, wherein:
a) the bar is disposed adjacent a front of the shield body;
b) the second hook extends through a slot in the shield body to a back, the slot:
   i) being disposed in the path of movement of said second hook; and
   ii) having first and second slot ends, at least the second slot end being adjacent the flange;
c) the second hook moves between the first and second slot ends in moving from the unlocked to the locked position; and
d) a distal end of the second hook engages the hole before the second hook engages the second end of the slot.

9. The anti-theft device of claim 8, wherein the distal end engages the hole when the bar is extended.

10. An automobile and airbag anti-theft device for attachment to an automotive steering wheel having a steering wheel section with an interior and an exterior perimeter and an airbag section protruding toward the driver to accommodate an airbag, said wheel further having a front side for facing a driver operating the wheel and a back side facing in the opposite direction, the anti-theft device comprising:
a) a rigid, one piece shield body sized to cover at least a portion of the steering wheel section and the airbag section, the shield body comprising:
   i) a front to face a driver; and
   ii) a back opposite the front to face the steering wheel, the shield body bowed concavely when viewed from the back to accommodate the protruding airbag section;
b) a bar slidably attached to the shield body and moveable between an unlocked position and a locked position, complete rotation of the steering wheel being prevented by the bar in the locked position;
c) a first hook fixed to the shield body to engage a first location on the back side and the interior perimeter of the steering wheel section;
d) a second hook fixed to the bar to engage a second location on the back side and the interior perimeter of the steering wheel section in the locked position, the anti-theft device being secured to the steering wheel in the locked position by the first and second hooks, wherein:
   i) the second hook in moving between the locked and unlocked positions defines a line across the shield body; and
   ii) the first hook is disposed in a location spaced from said line; and
e) a lock operatively connected to the bar to prevent movement of the bar from the locked to the unlocked position.

11. The anti-theft device of claim 10, comprising:
a) a housing attached to the front to secure the bar to the shield body;
b) a passage disposed in the housing to accept movement of the bar between said unlocked and locked positions; and
c) a bar guide disposed in the passage between the bar and the front, the bar guide shaped to ease movement of the bar between the locked and unlocked positions and to compensate for the bowed shield body.

12. The anti-theft device of claim 11, wherein the housing extends across the entire shield body to add rigidity thereto.

13. The anti-theft device of claim 12, further comprising a plastic cover attached to the anti-theft device to provide coverage of the anti-theft device and at least one edge thereof to protect the anti-theft device, the steering wheel, or the driver.

14. An automobile and airbag anti-theft device for attachment to an automotive steering wheel having a steering wheel section with an interior and an exterior perimeter and an airbag section protruding toward the driver to accommodate an airbag, said wheel further having a front side for facing a driver operating the wheel and a back side facing in the opposite direction, the anti-theft device comprising:
a) a rigid, one piece shield body sized to cover only a portion of the steering wheel section and the airbag section, the shield body comprising:
   i) a front to face a driver;
   ii) a back opposite the front to face the steering wheel, the shield body bowed concavely when viewed from the back to accommodate the protruding airbag section;
   iii) side edges; and
   iv) a flange which extends from the side edges to cover adjacent areas of said exterior perimeter of the steering wheel;
b) a bar slidably attached to the shield body and moveable between an unlocked position and a locked position, complete rotation of the steering wheel being prevented by the bar in the locked position;
c) a first hook fixed to the shield body to engage a first location on the back side and the interior perimeter of the steering wheel section;
d) a second hook fixed to the bar for movement along a predetermined path to engage a second location on the back side and the interior perimeter of the steering wheel section in the locked position, the anti-theft device being secured to the steering wheel in the locked position by the first and second hooks, wherein:
   i) the second hook in moving between the locked and unlocked positions defines a line across the shield body;
   ii) the first hook is disposed in a location spaced from said line;
   iii) the flange further comprises a hole disposed in the path of movement of said second hook; and
   iv) the second hook is engaged in the hole in said locked position such that the second location of the steering wheel section is surrounded by the second hook, the flange, and the shield body; and
e) a lock operatively connected to the bar to prevent movement of the bar from the locked to the unlocked position.

15. An automobile and airbag anti-theft device for attachment to an automotive steering wheel having a steering wheel section with an interior and an exterior perimeter and an airbag section, said wheel further having a front side for facing a driver operating the wheel and a back side facing in the opposite direction, the anti-theft device comprising:

a) a rigid, one piece shield body sized to cover only a portion of the steering wheel section and the airbag section, said shield body comprising:
  i) a front to face a driver,
  ii) a back opposite the front to face the steering wheel, and
  iii) a slot extending therethrough from the front to the back;
b) a bar slidably attached to the front of the shield body and moveable between an unlocked position and a locked position, complete rotation of the steering wheel being prevented by the bar in the locked position;
c) a housing fixed to the front of said shield in overlying relation to said bar and leaving a major part of the front of said shield uncovered thereby, said housing further having a configuration providing rigidity and stiffness to said shield;
d) a first hook fixed to the back of the shield body to engage a first location on the back side and the interior perimeter of the steering wheel section;
e) a second hook fixed to the bar and extending through said slot to engage a second location on the back side and the interior perimeter of the steering wheel section in the locked position, the anti-theft device being secured to the steering wheel in the locked position by the first and second hooks; and
f) a lock operatively connected to the bar to prevent movement of the bar from the locked to the unlocked position.

* * * * *